United States Patent [19]

Genske et al.

[11] Patent Number: 5,071,686
[45] Date of Patent: Dec. 10, 1991

[54] FILMS OF POLYPROPYLENE BLENDS AND POLYETHYLENE BLENDS AND ARTICLES MADE THEREWITH

[76] Inventors: Roger P. Genske, 971 Nenning Rd.; Yong J. Kim, 1261 Meadow La.; Russell P. Gehrke, 1349 Mulberry La., all of Neenah, Wis. 54956; Richard E. Johnson, Jr., 202 Royal Ct., #6, Appleton, Wis. 54915; R. Daniel Webster, 830 Hillside Ave., Barrington, Ill. 60010; Leonard F. Czuba, 1105 E. Adams, Lombard, Ill. 60148

[21] Appl. No.: 802,908

[22] Filed: Nov. 29, 1985

[51] Int. Cl.⁵ .............................................. B29D 22/00
[52] U.S. Cl. ................................. 428/35.7; 428/213; 428/516; 428/345; 525/240
[58] Field of Search ................. 428/516, 213, 35.7, 428/349; 525/240

[56] References Cited

U.S. PATENT DOCUMENTS

| | | | |
|---|---|---|---|
| Re. 28,688 | 1/1976 | Cook | 260/4 |
| 2,877,206 | 3/1959 | Scott | 260/45.5 |
| 2,993,876 | 7/1961 | McGlamery | 260/45.5 |
| 3,192,288 | 6/1965 | Sayko | 260/897 |
| 3,299,174 | 1/1967 | Kuhre et al. | 260/876 |
| 3,424,649 | 1/1969 | Nyberg et al. | 161/253 |
| 3,572,721 | 3/1971 | Harrison et al. | 372/218 |
| 3,665,059 | 5/1972 | Mahlman | 260/897 A |
| 3,689,595 | 9/1972 | Gwinn | 260/876 B |
| 3,701,702 | 10/1972 | Schichman | 156/244 |
| 3,758,643 | 9/1973 | Fischer | 260/897 A |
| 3,793,283 | 2/1974 | Frailey | 260/33.6 A |
| 3,806,558 | 4/1974 | Fischer | 260/897 A |
| 3,850,474 | 11/1974 | Welch | 296/31 P |
| 3,862,106 | 1/1975 | Fischer | 260/80.78 |
| 3,962,018 | 6/1976 | Costemalle | 156/306 |
| 4,104,210 | 8/1978 | Coran et al. | 260/4 R |
| 4,140,162 | 2/1979 | Gajewski | 150/1 |
| 4,189,519 | 2/1980 | Ticknor | 428/476 |
| 4,194,039 | 3/1980 | Mueller | 428/213 |
| 4,210,686 | 8/1980 | Gajewski | 428/35.5 |
| 4,230,767 | 10/1980 | Isaka | 428/349 |
| 4,250,273 | 2/1981 | Bohm et al. | 525/99 |
| 4,275,120 | 6/1981 | Werner | 428/516 |
| 4,297,411 | 10/1981 | Weiner et al. | 428/347 |
| 4,311,808 | 1/1982 | Su | 525/222 |
| 4,322,465 | 3/1982 | Webster | 428/194 |
| 4,330,639 | 5/1982 | Matsuura et al. | 525/240 |
| 4,337,188 | 6/1982 | Climenhage et al. | 524/140 |
| 4,350,795 | 9/1982 | Bohm | 525/194 |
| 4,357,376 | 11/1982 | Nattinger | 428/35 |
| 4,361,628 | 11/1982 | Krueger et al. | 428/475.8 |
| 4,391,862 | 7/1983 | Bornstein | 428/35 |
| 4,440,815 | 4/1984 | Zomorodi | 428/35 |
| 4,460,361 | 7/1984 | Stegmeier et al. | 604/319 |
| 4,528,220 | 7/1985 | Hwo | 428/35 |
| 4,734,459 | 5/1988 | Cecchin et al. | 525/247 |
| 4,769,261 | 9/1988 | Hazelton et al. | 428/35 |

FOREIGN PATENT DOCUMENTS

| | | |
|---|---|---|
| 52557 | 5/1982 | European Pat. Off. |
| 2415056 | 1/1979 | France |
| 2072744 | 6/1977 | Japan |
| 4103478 | 8/1979 | Japan |
| 8157839 | 9/1983 | Japan |
| 1168541 | 10/1969 | United Kingdom |
| 2055688 | 3/1981 | United Kingdom |

*Primary Examiner*—Edith Buffalow

[57] ABSTRACT

Novel films are disclosed which contain blends of ethylene-based copolymers or other elastomers with polypropylene and polyethylene. Typical films have two-five layers wherein at least one layer is a blend of high density polyethylene with an ethylene-based copolymer or another elastomer and has additional layers of polypropylene blended with an ethylene-based copolymer or another elastomer.

34 Claims, 3 Drawing Sheets

FILMS OF POLYPROPYLENE BLENDS AND POLYETHYLENE BLENDS AND ARTICLES MADE THEREWITH

BACKGROUND OF THE INVENTION

Polypropylene provides excellent resistance to high temperature processing, such as at retort conditions of about 250° F. for about 30 minutes. Polypropylene has thus found widespread use, particularly as a sealant layer in pouches which are subjected to heat treatment after the pouch is filled with product and sealed. While polypropylene has been accepted as the material of choice for use in sealant layers of retortable pouches, it has been selected more or less by necessity, as few other materials in the same general price range can provide similar high temperature processability. Likewise, for some uses such as in contact with food or medical solutions, polypropylene is among the few materials which is approved for product contact. Thus, polypropylene provides a combination of desirable properties which is not found in other known materials.

Polypropylene does have associated undesirable properties. Most prominent in packages is the tendency of the polypropylene to be brittle, and to be even more brittle after is has been retort processed. The degree of brittleness of a package film is most easily detected by measuring the capability of a package to tolerate physically stressful treatment. Brittleness of the overall package is a property which is a composite of the brittleness of the individual layers, interfacial bond strengths, the elasticity of adjacent layers and their capability to absorb and dissipate physical shock, and any overwhelming brittleness of any one layer.

The composite brittleness of retort processed packages using polypropylene may generally be observed as the fraction of the packages which fail after being subjected to physical stress or shock.

Polyethylenes in the density range of about 0.91 to about 0.965, and linear low density polyethylenes (LLDPE) have many fine and desirable properties which make them particularly suitable for many uses. Polyethylene ("PE") as used herein is defined as those polyethylenes, homopolymer and copolymer, which have a density in the range of about 0.91 to about 0.965, and LLDPE. Many PE's are stiff and rigid, able to hold shape in thick sections. PE is readily processed and formed in both the solid form and the more fluid plasticated form. It is relatively economical for many uses. In packaging applications it has been found to provide a good barrier to transmission of water vapor. And it is particularly the packaging application which is of interest to the inventors herein, while it will be seen that other applications may abound.

High density polyethylene (HDPE, having a density greater than about 0.94) in particular is known to provide excellent properties of stiffness and resistance to transmission of moisture vapor. It also has acceptable high temperature processing capabilities.

It would be desirable to combine layers of polypropylene and PE into one packaging film to obtain the combined properties of high temperature processability, a strong heat seal, and resistance to water vapor transmission. The package should also have excellent tolerance of physical shock abuse.

Polypropylene and PE layers may be combined into a multiple layer film as by adhesive lamination. Such a construction, though, has undesirable cost disadvantage of the plurality of steps necessary in its fabrication. Further, such films do tend to exhibit the brittleness which is a normal property of polyproyplene. The brittleness may be somewhat improved upon by using a polypropylene copolymer rather than the homopolymer. While there is some improvement in performance with the use of the copolymer, the general level of brittleness is still so high as to be effective to prevent widespread use of such structures.

If, however, an economical structure could be made which would combine the desirable properties of polypropylene and PE while improving on the ability of the package to tolerate physical abuse, such a package may find substantial utility and acceptance. Such a structure may use novel compositions of matter in one or more layers, and might use particular combinations of layers and positional relationships to achieve the balance of properties desired.

It is an object of this invention to provide multiple layer films made from compositions of polymers.

It is a specific object to provide multiple layer films suitable for use in retortable packages which have excellent tolerance to shock abuse both before and after retort processing.

A direct object is to provide closed and sealed packages having increased tolerance to shock abuse.

It is finally an object of the invention to provide novel process for making a multiple layer film which is useful in packaging.

SUMMARY OF THE DISCLOSURE

One embodiment of the invention is seen in multiple layer films containing a novel composition of matter which is a blend of polypropylene and (i) an ethylene-based copolymer selected from the group consisting of ethylene butene-1 copolymers and ethylene propylene copolymers (hereinafter referred to as EBC) or (ii) a more conventional elastomer, such as polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer, (thereinafter, the aforesaid groups (i) and (ii) of materials is sometimes referred to as the "Modifiers".) The terms "elastomer" and "elastomeric" describe polymers, copolymers, rubbers, and the like, which at room temperature can be stretched substantially under low stress, and upon immediate release of the stress, have the tendency to return generally to approximately the original shape.

In preferred compositions of this embodiment, the blend is about 30% by weight to about 80% by weight polypropylene and about 70% by weight to about 20% by weight of a Modifier.

The EBC is essentially a copolymer of two moieties, both moieties being present in the main chain of the polymer. The overall mole ratio is about 10 to about 95 mole percent ethylene, and conversely about 90 to about 5 mole percent of the second moiety. The ethylene is preferably copolymerized with either propylene or butene-1. In the case of propylene, the mole ratio preferred range is about 60% to about 80% ethylene and about 40% to about 20% propylene. One such material is sold by Mitsui Petrochemical Industries, Ltd. as TAFMER P. In the case of butene-1, the mole ratio preferred range is about 5% to about 15% butene-1 and about 95% to about 85% ethylene. One such material containing butene-1 is sold by Mitsui Petrochemical Industries, Ltd. as TAFMER A. TAFMER P is elastomeric. TAFMER A has some properties representative of elastomers, as seen from the following EXAMPLES herein.

The multiple layer films of this invention include a basic two layer structure comprising first and second layers, wherein said first layer comprises a blend of a polypropylene polymer (preferably in the range of about 20% to about 95%) chosen from the group consisting of polypropylene homopolymer and polypropylene copolymer, and a Modifier (preferably in the range of about 80% to about 5% ). The second layer contains PE or PE blended with a Modifier. A second basic structure comprises said first and second layers and further includes a third layer adhered to the second layer wherein the third layer is a blend of polypropylene and a Modifier, preferably, an EBC.

Further, it is within the scope of this invention to provide films of more than three layers, wherein additional layers may be adhered to either of the outside surfaces of the first and third layers of the said basic three-layer structure. Preferably, such additional layers are of the same composition of the first, second or third layers of the said basic three-layer structure.

The preferred composition of the second layer of the two- or three-layer basic structures is about 65% to about 95% of the PE (preferably HDPE) and about 35% to about 5% of the a Modifier, preferably EBC.

The invention is further embodied in packages, such as pouches, made from multiple layer films. While the particular form of the package is not critical, typical packages are fabricated from flexible film by the use of heat seals to make closed and sealed packages.

Preferably, the multilayer films of this invention are coextruded but they may be made of other methods such as by lamination.

DETAILED DESCRIPTION OF SPECIFIC EMBODIMENTS THE INVENTION

Preferred embodiments of the invention are seen as multiple layer film structures.

One preferred embodiment of the invention is a two layer coextruded film having a first layer of polypropylene blend and second layer of PE blend. In this embodiment, the polypropylene layer and the PE layer are affixed to each other in face-to-face contact with each other, with good adhesion and preferably without the use of intervening adhesives.

Another preferred embodiment is a three layer film having first and third layers of polypropylene blends and a second layer of a PE blend. In this embodiment, the first and third polypropylene layers are affixed in surface-to-surface contact with the second PE layer, on opposing surfaces thereof, preferably without the use of intervening adhesives.

Figure 1:
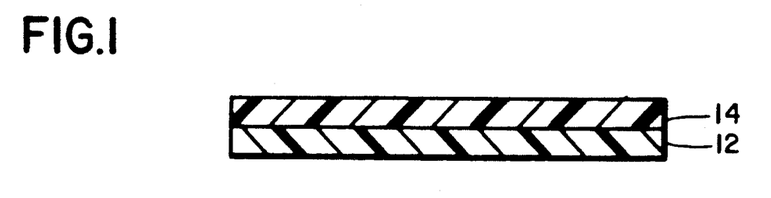
FIG. 1 is a cross-section of a two layer film of this invention.

Turning now to the drawings, FIG. 1 represents a cross-sectional view of the basic two layer film structure of the invention. Layer 12 is a blend of a polypropylene and Modifier, preferably EBC. Layer 14 is a blend of a PE and a Modifier, preferably EBC.

Films of the embodiments of FIG. 1 may be used for making packages wherein either layer 12 or layer 14 is on the outside, or conversely on the inside of a package made therefrom. The selection of specific polymers, blend compositions, and layer thicknesses and ratios depends on the end use contemplated.

Figure 2:
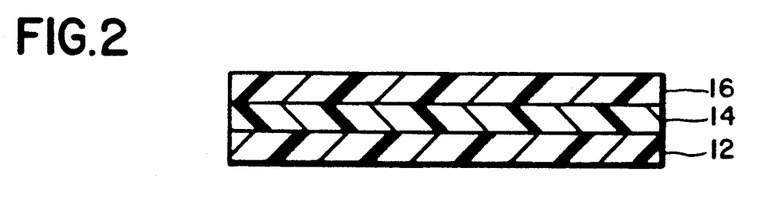
FIG. 2 is a cross-section of a three layer film of this invention.

FIG. 2 represents a cross-sectional view of the basic three layer film structure of this invention. As in the two layer embodiment of FIG. 1, layer 12 is a blend of polypropylene and Modifier, preferably EBC and layer 14 is a blend of a PE and Modifier, preferably EBC. Layer 16, is a blend of a polypropylene and Modifier, preferably EBC.

Figure 6:
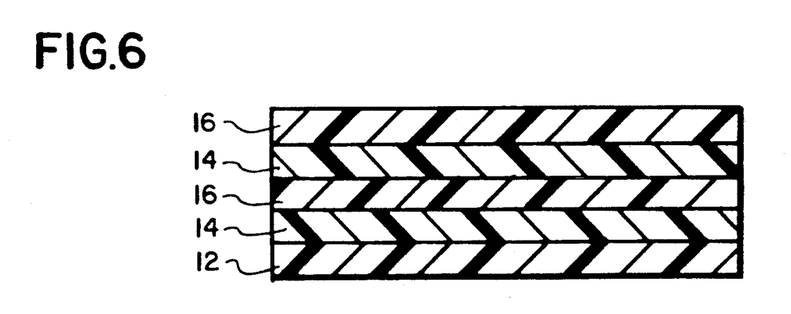
FIG. 6 is a cross-section of a five layer film of this invention.

FIG. 6 illustrates a five layer film of this invention comprising layers 12, 14, 16, 14 and 16. The composition of each layer is desirably the same as the composition of the like-numbered layer previously described, although the Modifiers may be different in some cases.

Figure 3:
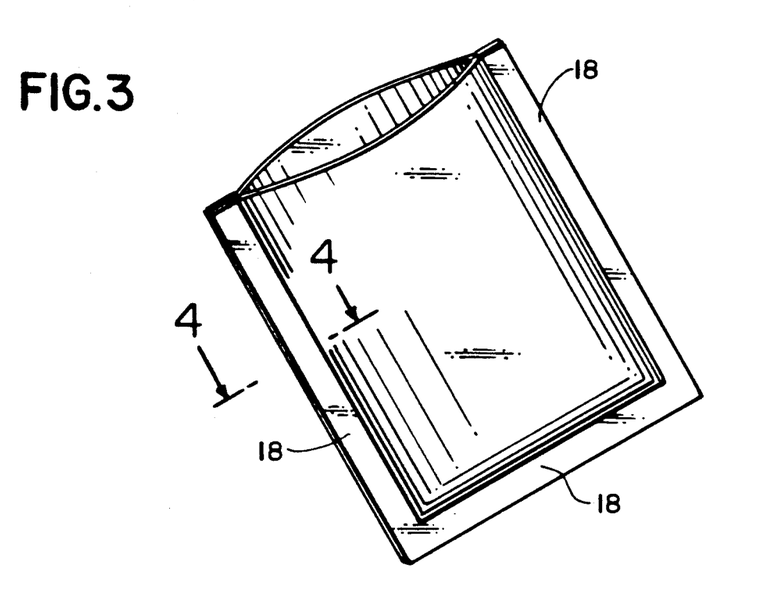
FIG. 3 is a pictorial view of a typical pouch-type package made from films of the invention.

The multilayer film of FIGS. 1, 2 and 6 are especially useful for making pouches such as the one seen in FIG. 3. In a preferred method of formation of that pouch, portions of the film are brought in face-to-face contact with each other such that the layers 12 on both of the facing portions are facing each other. Heat seals 18 are formed about the common periphery of the facing portion to make an enclosed package capable of holding a product. After product is inserted into the package, a final heat seal is made across the open end to close and seal the package.

Referring specifically to the overall thickness of the films of FIGS. 1, 2 and 6, they are preferably between about 2 mils and about 8 mils thick. The lesser thickness of about 2 mils represents about the thinnest film which has good tolerance of shock abuse in typical commercial handling of packages filled with a liquidous product. The greater thickness of about 8 mils provides a film having essentially as much strength as can be achieved economically in a flexible package. While greater film thicknesses are possible, functional, and are included in the invention herein, they are generally more costly, and so are not preferred.

In the overall film structure of FIGS. 1, 2, and 6, layer 12 is the layer which is used as the inside surface layer, and to form the heat seals where the film is used in a heat sealed package. For these applications, the heat seal layer 12 should be at least about 1 mil thick, to facilitate formation of strong heat seals. Preferably, layer 12 has a thickness of approximately 3 mils to about 4½ mils thick. In a preferred embodiment of films having multiple layers, layer 12 comprises approximately 60% of the total thickness of the multilayer film. This provides a film that has good durability and forms excellent heat seals. Moreover, this maximizes the sealant layer relevant to the maximum thickness of the film, while still achieving balanced film properties.

Layer 14 functions primarily as an effective barrier to infusion of moisture vapor. For this function, it should be at least about 0.5 mil thick. While the minimum thickness of about 0.5 mil is usually effective for barrier purposes, a thickness of approximately 1 mil to about 1½ mils is preferred. This thickness provides a multilayer film that has good clarity and flexibility while still providing a water vapor barrier. In a preferred embodiment, layer 14 comprises approximately 20% of the total thickness of the multilayer film.

Figure 4:
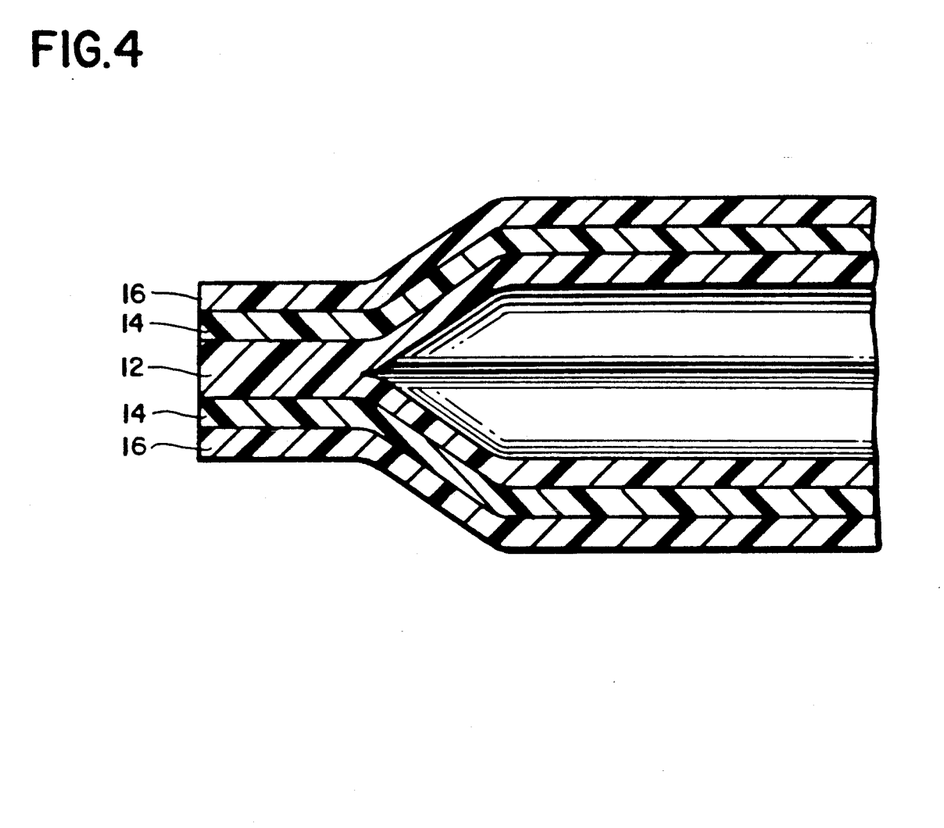
FIG. 4 is an enlarged cross-section of a portion of the pouch of FIG. 3, and taken at 4—4 of FIG. 3.

Layer 16 is typically used as the outside layer of the package, as seen in FIG. 4. As such, it serves a primary function of providing resistance to penetration of the package as by puncture, cutting, or abrasion. To serve this function, it requires a degree of physical substance in terms of thickness, and about 0.5 mil is usually the minimum thickness which will provide this functional performance, so this is a preferred minimum thickness. For most typical applications, though, layer 16 is somewhat thicker, and a thickness of approximately 1 mil to about 1½ mils is generally preferred. In a preferred embodiment, layer 16 comprises approximately 20% of the total thickness of the multilayer film.

A secondary function of layer 16 is in its surface properties as they relate to other surfaces which it contacts in various machining operations, and as it is brought into contact with surfaces of other films or packages. As regards machining operations, sufficient surface friction is needed to enable drawing the film through packaging machines. However, high levels of friction are often associated with blocking, or sticking, of films together. Conventional slip and anti-block additives may be used as needed in any of the film layers, but are particularly applicable to layers 12 and 16, most particularly to layer 16. Where conventional additives are used, they are not considered herein in defining the percent of each component in the composition.

In the preferred multilayer structures, the composition of each of the layers 12, 14 and 16 is a blend of polymer and a Modifier. The affect of blending a Modifier into the layers is seen in a plurality of beneficial evidences. First, the interfacial adhesion between the PE layer and the adjacent polypropylene layers is enhanced by the inclusion of a Modifier in each of the layers. Second, the ability of packages fabricated from the multiple layer films of the invention to withstand shock abuse, both before and after retort processing, is higher than for similar films which do not include EBC in the blend compositions. Finally, the films having a Modifier incorporated therein have improved capability to be flexed and folded repeatedly without developing cracks as a result of the flexing and folding.

The overall composition of layer 12 is preferably about 20% by weight to about 95% by weight, most preferably about 30% to about 80%, of a polypropylene polymer either homopolymer or copolymer or a blend of homopolymer and copolymer, and preferably about 80% by weight to about 5% by weight, most preferably about 70% to about 20%, of a Modifier.

The overall range of compositions of layer 16 is the same as the range of compositions defined for layer 12. Layers 16 and 12 need not, however, have the same compositions. Their compositions may vary, somewhat independent of each other so long as they stay within the defined ranges of compositions for those layers.

Any of the known polypropylene polymers may be used for the polypropylene component of layers 12 and 16. Included are both homopolymers and copolymers. Thus, wherever in the writing "polypropylene" is mentioned, it is intended to include both homopolymer and copolymer, except where otherwise specifically stated.

The overall composition of layer 14 is preferably about 2% by weight to about 50% by weight, most preferably about 5% to about 35% Modifier and, preferably, about 98% by weight to about 50% by weight, most preferably about 95% to about 65%, HDPE. In most-preferred embodiments, the composition is at least about 70% HDPE and no more than about 30% Modifier.

In some cases, it may be advantageous that the Modifiers be different in adjacent layers provided adequate adhesion is observed. However, enhanced adhesion may be obtained at the layer interface between a polypropylene polymer layer and an HDPE layer wherein both layers have the same Modifier as a component of the composition of each of the layers. A most preferred structure is one where the same EBC composition is used as a component of both layers. It is, however, typical that different fractions of the EBC composition be used in the different layers.

A coextrusion of polypropylene and HDPE without EBC had an interlayer adhesion of about 100 grams per inch width. A similar extrusion, but including 30% TAFMER A in the HDPE layer 14, and 40% TAFMER A in the polypropylene layer 12, had such good interlayer adhesion that it could not be separated, using the same conventional peel test.

Figure 5:
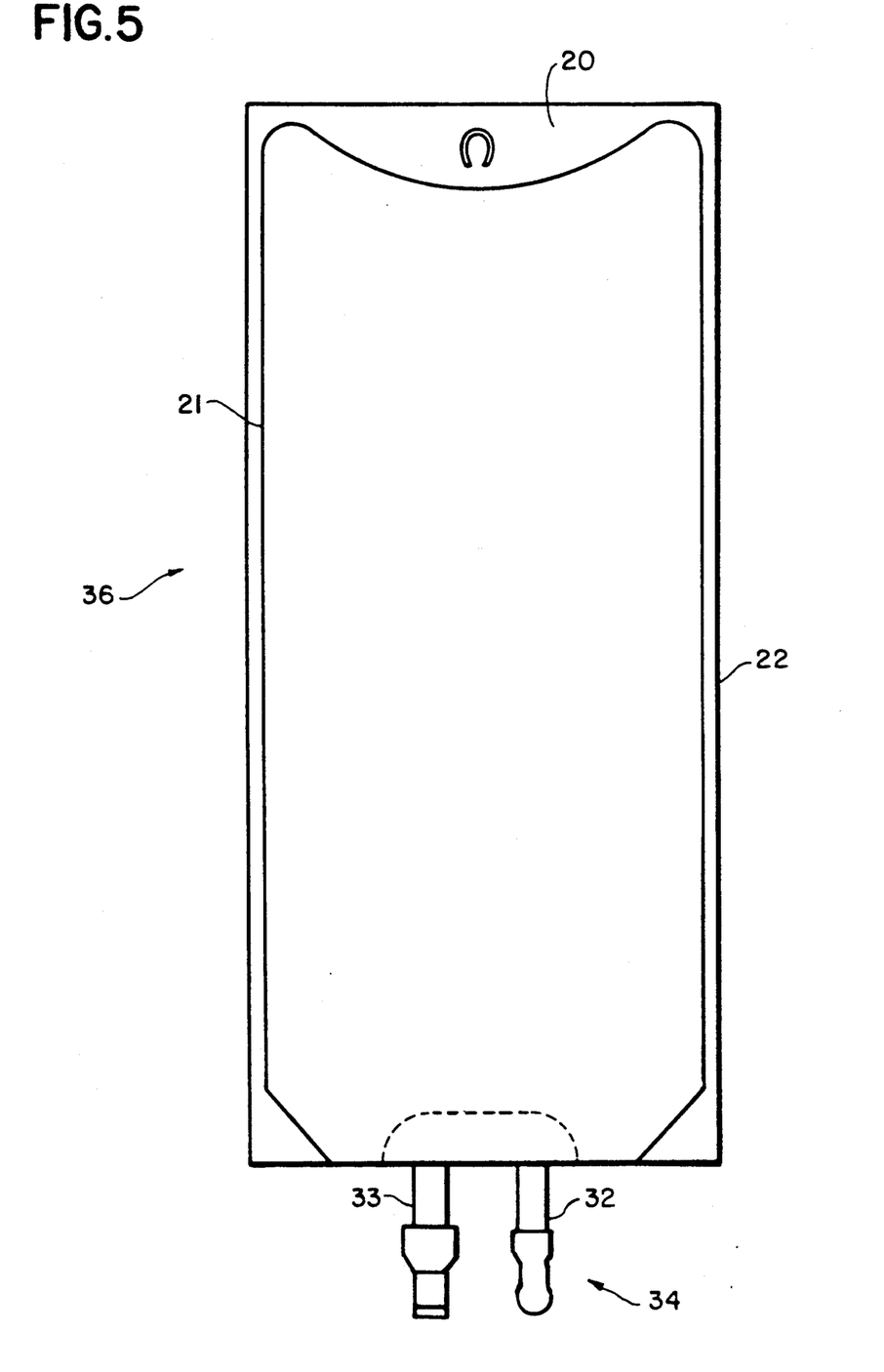
FIG. 5 is a pictorial view of a preferred pouch-type package made from films of the invention.

In a further preferred method for forming packages from the films of the present invention a form, fill and seal packaging machine (not shown) can be utilized. In a typical form, fill and seal packaging machine the film is fed into the machine to a former for folding the web of film. The former is typically situated so that the sheet is folded around a dispensing tube. To create a sealed pouch, as shown in FIG. 5, the packaging machine includes two sealing stations. At one sealing station an end seal 20 is created in the film and at the second sealing station a first side seal 21 is created in the film. After the first side seal 21 is created, the product to be housed is dispensed into the film and a second side seal 22 is created to enclose the product. After the second side seal 22 is created the film is severed and a filled flexible container 36 is thereby created as shown in FIG. 5.

Also, illustrated in FIG. 5 fitments 32 and 33 (which preferably are a single unit 34) may be sealed to the inside or outside layer of the container 36. Preferably, the fitment 34 is heat sealed to the inside layer 12. Due to the construction of the inside layer 12, a strong heat seal is created.

Thus, the present invention creates films that can run through form, fill and seal packaging machines to create flexible pouches and containers 36 including a fitment 34 that can house a medical product to be maintained and extracted under sterile conditions.

EXAMPLE 1

Pellets of a polypropylene copolymer, having about 4.5 mole percent ethylene, are dry blended with pellets of a styrene ethylene butylene styrene elastomer Modifier in a weight ratio of about 75% polypropylene to about 25% elastomer Modifier. This blend of pellets is coextruded with a layer of the same polypropylene in unblended composition. The thickness of the thus formed two layer film is about 6.5 mils, with about 84% of the thickness being the blend layer and about 16% of the thickness being the unblended polypropylene copolymer layer.

EXAMPLE 2

Pellets of a polypropylene copolymer, having about 4.5 mole percent ethylene, are dry blended with pellets of styrene ethylene butylene styrene Modifier in a weight ratio of about 75% polypropylene and about 25% elastomer Modifier. This blend of pellets is coextruded with a layer of the same polypropylene in unblended composition. The thickness of the thus formed two layer film is about 6.5 mils, with about 75% of the thickness being the blend layer and about 25% of the thickness being the unblended polypropylene copolymer layer.

EXAMPLE 3

A three layer film is made by coextruding high density polyethylene blended with an elastomer Modifier between two layers of polypropylene blended with an elastomer Modifier. The polypropylene blend is about 75% by weight polypropylene and about 25% by weight styrene ethylene butylene styrene copolymer. Pellets of an ethylene propylene diene monomer terpolymer elastomer Modifier are dry blended with pellets of a high density polyethylene in a weight ratio of about 25% elastomer Modifier and about 75% high density polyethylene to form the composition for the middle layer. A three layer film about 6.5 mils thick is thus formed by the coextrusion; the basic layer structure being PPE/HDPE/PPE, with elastomer modifications to the layers as indicated. The two layers of polypropylene copolymer are about 33% and about 46% respectively of the overall film thickness. Correspondingly the high density polyethylene layer is about 21% of the overall film thickness.

EXAMPLE 4

A three layer film about 6.5 mils thick is made by coextrusion as in EXAMPLE 3 using the same polypropylene blended with an elastomer Modifier as the two outer layers. The high density plyethylene layer is a blend of high density polyethylene and polyisobutylene, in a weight ratio of about 20% polyisobutylene and about 80% high density polyethylene. The two layers of polypropylene copolymer are about 39% and about 40% respectively of the overall film thickness. Correspondingly, the layer of high density polyethylene is about 21% of the overall film thickness.

EXAMPLE 5

A three layer film about 6.5 mils thick is made by coextrusion as in EXAMPLE 3 using the same polypropylene blended with an elastomer Modifier as the two outer layers. The high density polyethylene layer is a blend of high density polyethylene and styrene butadiene styrene elastomer Modifier, in a weight ratio of about 20% styrene ethylene butylene styrene copolymer and about 80% high density polyethylene. The two layers of polypropylene copolymer blend are about 27% to about 49% respectively of the overall film thickness. Correspondingly, the layer of high density polyethylene blend is about 24% of the overall film thickness.

EXAMPLES 6-21

Additional 2-layer and 3-layer films were formed by coextrusion processes. The so-formed films were fabricated into pouches by forming heat seals as described hereinabove with reference to FIG. 3. The pouches were filled to their capacity with about 1 liter of liquid and were sealed closed. Some of the pouches were then retort processed for about 30 minutes at about 250° F. The pouches, both those which were retort processed and those which were not, were then subjected to drop testing.

In the drop testing, the pouches were dropped in a free fall onto a hard surface. The height of the drop was increased, up to about 9 feet, until the pouches failed on impact. A failure was defined as rupture of the package, or a significant weakening of the package, particularly at the heat seals. If a package survived a maximum of the 9 foot drop, it was reported as 9 feet.

The results of the testing on EXAMPLES 6-21 are shown in the following Table 1, wherein EXAMPLES 6-19 are pouches made of films of the present invention, and EXAMPLES 20 and 21 are pouches made of other films. The table shows pouch film construction, film thickness, and the maximum successful drop heights for the pouches, where some of the pouches tested had been retort processed, and some had not been retort processed. The pouch film construction shows the weight percent of each component in each layer, ignoring conventional additives of slip and anti-block. Under each layer composition is the percent that the layer represents of the overall thickness of the entire film.

TABLE 1

| Example No. | Pouch Construction | | | Film Thickness Mils | Maximum Successful Drop Height | |
|---|---|---|---|---|---|---|
| | Inner Layer | Middle Layer | Outer Layer | | Not Retort Processed | Retort Processed |
| 6 | 60% PPE 40% Tafmer A 80% | 70% HDPE 30% Tafmer A 20% | | 8 | 9 | 9 |
| 7 | 60% PPE 40% Tafmer A 60% | 70% HDPE 30% Tafmer A 20% | 60% PPE 40% Tafmer A 20% | 8 | 9 | 9 |
| 8 | 40% PPE 60% Tafmer A 80% | 98% HDPE 2% PB 20% | | 6 | 9 | 6 |
| 9 | 40% PPE 60% Tafmer A 60% | 98% HDPE 2% PB 20% | 40% PPE 60% Tamfer A 20% | 6 | 9 | 9 |
| 10 | 70% PPE 30% Tafmer P 80% | 50% HDPE 50% Tafmer A 20% | | 6 | 9 | 9 |
| 11 | 70% PPE 30% Tafmer P 60% | 50% HDPE 50% Tafmer A 20% | 70% PPE 30% Tafmer P 20% | 6 | 9 | 9 |
| 12 | 70% PPE | 80% HDPE | | 6 | 9 | 9 |

TABLE 1-continued

| Example No. | Pouch Construction | | | Film Thickness Mils | Maximum Successful Drop Height | |
|---|---|---|---|---|---|---|
| | Inner Layer | Middle Layer | Outer Layer | | Not Retort Processed | Retort Processed |
| 13 | 30% Tafmer P 70% PPE 30% Tafmer 83% 67% | 20% SIS 80% HDPE 20% SIS 17% 16% | 70% PPE 30% Tafmer P 17% | 6 | 9 | 9 |
| 14 | 62% PPE 38% PIB 80% | 95% HDPE 5% PB 20% | | 6 | 6 | 6 |
| 15 | 62% PPE 38% PIB 60% | 95% HDPE 5% PB 20% | 62% PPE 38% PIB 20% | 6 | 4 | 2 |
| 16 | 50% PP 50% Tafmer A 80% | 90% HDPE 10% SEBS 20% | | 6 | 5 | 4 |
| 17 | 50% PP 50% Tafmer A 60% | 90% HDPE 10% SEBS 20% | 50% PP 50% Tafmer A 20% | 6 | 4 | 4 |
| 18 | 80% PP 20% SEBS 80% | 80% HDPE 20% SIS 20% | | 6 | 4 | 4 |
| 19 | 80% PPE 20% SEBS 80% | 80% HDPE 20% Tafmer P 20% | | 6 | 5 | 5 |
| 20 Comparative Example | 100% PP 80% | 100% HDPE 20% | | 6 | 1 | 0.5 |
| 21 Comparative Example | 100% PP 60% | 100% HDPE 20% | 100% PP 20% | 6 | 1 | 0.5 |

PPE = Polypropylene copolymer
PP = Polypropylene homopolymer
HDPE = High Density Polyethylene
SIS = Styrene Isoprene Styrene Copolymer
PIB = Polyisobutylene
SEBS = Styrene Ethylene Butylene Styrene Copolymer
PB = Polybutylene As seen from the tabulated results, the pouches made from the films of this invention have superior drop test properties compared to pouches made of films other than films of this invention.

The films described and illustrated herein may be used for a multiplicity of applications. Advantageously, the films are used to form sealed pouches, preferably heat sealed pouches, and most advantageously such pouches which are filled with product and subjected to retort processing at temperatures of about 250° F. for times typically about 30 minutes. The term "films" typically refers to flexible sheet structures of up o about 8 mils thickness. As used herein, it is intended to also include thicker sheet structures having semi-rigid or rigid properties. Such sheet structures may be used to form semi-rigid or rigid trays, decorative panels, and other moldings; and same are contemplated herein. Indeed, a container may be fabricated from a formed tray made from a thicker structure of the invention and may have a thinner film lid also made from film of the invention.

The multilayer films of the invention are especially preferred for use in making packages which will be subjected to retort processing. Typical retort processing is at about 250° F. for about 30 minutes. Temperatures may be as high as about 275° F. ; time as long as about 45 minutes. Temperature and/or time of processing is adjusted according to particular needs or desires. For use with somewhat higher temperatures or somewhat longer processing times, films having higher fractions of polypropylene, within the iterated ranges, are used. Lower fractions of polypropylene are sometimes preferred when the package will not be subjected to more severe processing associated with the highest temperatures and longest times of retort processing.

Thus it is seen that the invention provides multilayer films containing novel compositions of polymers blended with Modifiers. The films are especially excellent for use as medical solution containers and pouches. They are also excellent for forming in retortable packages and having excellent resistance to shock abuse both before and after retort processing.

Finally, the invention provides novel process for making multiple layer films which are useful in packaging.

Having thus described the invention, what is claimed is:

1. A multiple layer film, comprising:
   (a) first and third layers each of said first and third layers comprising compositions of (i) polypropylene polymer chosen from the group consisting of polypropylene homopolymer and polypropylene copolymer and (ii), as a second component, a polymer composition chosen from the group consisting of ethylene butene-1 copolymers and ethylene propylene copolymers; and
   (b) a second layer, the composition of said second layer comprising polyethylene;
   said second layer being between said first and third layers.

2. A multiple layer film as in claim 1, wherein the composition of each of said first and third layers is about 20% by weight to about 95% by weight polypropylene and about 80% by weight to about 5% by weight of said second component.

3. A multiple layer film as in claim 1, wherein said polyethylene in said second layer is high density polyethylene and wherein the composition of said second layer further comprises a second component, said second component being chosen from the group consisting of ethylene butene-1 copolymer and ethylene propylene copolymer.

4. A multiple layer film as in claim 1, and wherein the composition of said second layer is about 65% by weight to about 95% by weight of said polyethylene and about 35% by weight to about 5% by weight of a second component selected from the group consisting of ethylene butene-1 copolymer and ethylene propylene copolymer.

5. A multiple layer film as in claim 4 wherein said polyethylene in said second layer is high density polyethylene.

6. A multiple layer film as in claim 1, wherein the composition of said second layer comprises a second component selected from the group consisting of ethylene butene-1 copolymers and ethylene propylene copolymers.

7. A multiple layer film as in claim 1, wherein the composition of each of said first and third layers is about 45% by weight to about 65% by weight polypropylene and about 55% to about 35% by weight of said second component, and wherein the composition of said second layer is about 65% by weight to about 95% by weight of said polyethylene and about 35% by weight to about 5% by weight of a second component selected from the group consisting of ethylene butene-1 copolymers and ethylene propylene copolymers.

8. A multiple layer film as in claim 1, and including a second component in said second layer, said second component being selected from the group consisting of ethylene butene-1 copolymers and ethylene propylene copolymers, and wherein the composition of said second component in each of said first and third layers is essentially the same as the composition of said second component in said second layer.

9. A multiple layer film as in claim 1, and wherein a fourth layer is adhered to said third layer, the composition of said fourth layer comprising polyethylene.

10. A multiple layer film of claim 9 wherein a fifth layer is adhered to said fourth layer, the composition of said fifth layer comprising polypropylene.

11. A multiple layer film of claim 9 or 10 wherein said second and fourth layers comprise high density polyethylene.

12. A multiple layer film as in any one of claims 3–7, 21 or 22 wherein the corresponding second components in adjacent layers are different materials.

13. A multiple layer film of any one of claims 1–10, or 21–34, said film being coextruded.

14. A package made with a film of any one of claims 1–10, or 21–34.

15. A package made with a film of claim 13, said package having been exposed to retort conditions of at least about 250° F. for a period of at least about 10 minutes.

16. A flexible container capable of housing a medical product to be maintained and extracted under sterile conditions, said container having been made with a film of any one of claims 1–10, or 21–34.

17. A multiple layer film of any one of claims 1–9 wherein said first layer comprises approximately 60% of the total thickness of said film.

18. A multiple layer film of claim 9 or 10 wherein said first layer comprises approximately 60% of the total thickness of said multiple layer film.

19. A multiple layer film of any of claims 1–8 wherein said second layer comprises approximately 20% of the total thickness of said film.

20. A multiple layer film of any one of claims 1–8 wherein said third layer comprises approximately 20% of the total thickness of said film.

21. A multiple layer film as in claim 9, the composition of said second layer comprising, as a second component, a composition providing elastomeric properties, and chosen from the group consisting of ethylene butene-1 copolymers and ethylene propylene copolymers, and the composition of said fourth layer comprising, as a second component, a composition providing elastomeric properties, and chosen from the group consisting of ethylene butene-1 copolymers and ethylene propylene copolymers.

22. A multiple layer film as in claim 10, the composition of said fifth layer comprising, as a second component, a composition providing elastomeric properties, and chosen from the group consisting of ethylene butene-1 copolymers and ethylene propylene copolymers.

23. A multiple layer film comprising:
(a) a first layer, said first layer comprising a composition of (i) polypropylene polymer chosen from the group consisting of polypropylene homopolymer and polypropylene copolymer and (ii), as a second component, a polymer composition chosen from the group consisting of ethylene butene-1 copolymer and ethylene propylene copolymer;
(b) a second layer, the composition of said second layer comprising a polyethylene; and
(c) a third layer, the composition of said third layer comprising a polypropylene composition,
said second layer being disposed between said first and third layers.

24. A multiple layer film as in claim 23 wherein the composition of said second layer is about 65% by weight to about 95% by weight of said polyethylene and about 35% by weight to about 5% by weight of a second component providing elastomeric properties.

25. A multiple layer film as in claim 23 or 24 wherein said polyethylene in said second layer is high density polyethylene.

26. A multiple layer film as in claim 24 wherein the composition of said second component in said second layer is selected from the group consisting of ethylene butene-1 copolymers and ethylene propylene copolymers.

27. A multiple layer film as in claim 23 wherein a fourth layer is adhered to said first layer, the composition of said fourth layer comprising polyethylene.

28. A multiple layer film as in claim 27 wherein a fifth layer is adhered to said fourth layer, the composition of said fifth layer comprising polypropylene.

29. A multiple layer film comprising:
(a) a first layer comprising a polypropylene composition;
(b) a second layer, the composition of said second layer comprising (i) polyethylene polymer chosen from the group consisting of polyethylene homopolymer and polyethylene copolymer and (ii), as a second component, a polymer composition providing elastomeric properties; and (c) a third layer comprising a polypropylene composition, said second layer being disposed between said first and third layers.

30. A multiple layer film as in claim 29 wherein the composition of said first layer is about 20% by weight to about 95% by weight polypropylene and about 80% by weight to about 5% by weight of a second component providing elastomeric properties.

31. A multiple layer film as in claim 29 wherein the composition of said third layer is about 20% by weight to about 95% by weight polypropylene and about 80% by weight to about 5% by weight of a second component providing elastomeric properties.

32. A multiple layer film as in any of claims 29-31 wherein said polyethylene in said second layer is high density polyethylene.

33. A multiple layer film as in claim 30 wherein the composition of said second component in said first layer is selected from the group consisting of ethylene butene-1 copolymers and ethylene propylene copolymers.

34. A multiple layer film as in claim 30 wherein the composition of said second component in said third layer is selected from the group consisting of ethylene butene-1 copolymers and ethylene propylene copolymers.

* * * * *